April 13, 1948.  H. A. MINER  2,439,484
FRICTION SHOCK ABSORBER
Filed Jan. 1, 1944
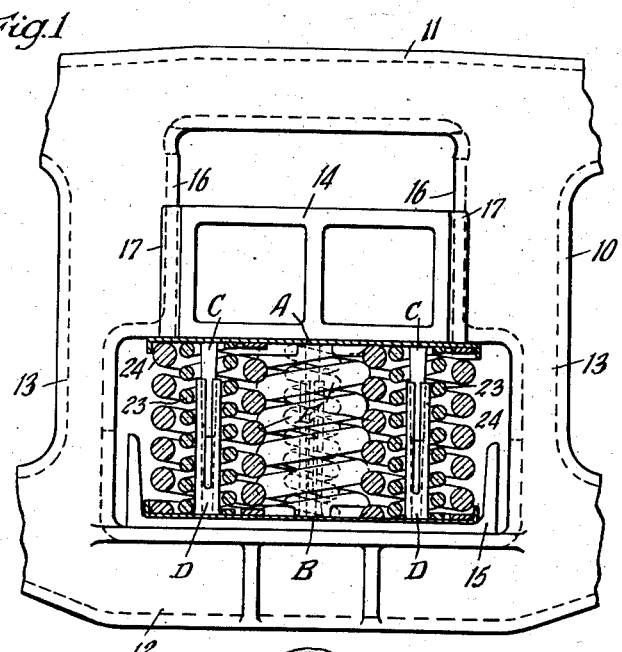
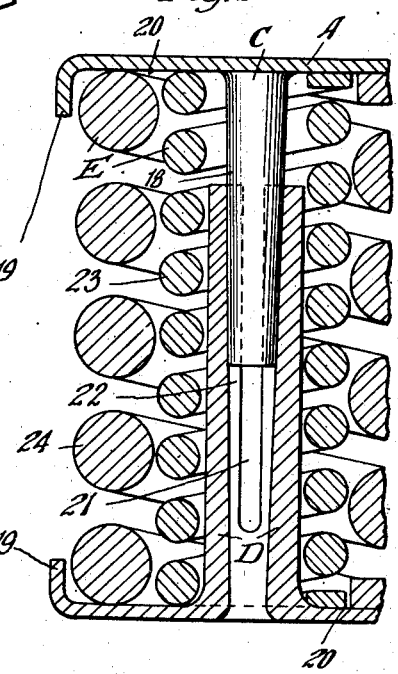
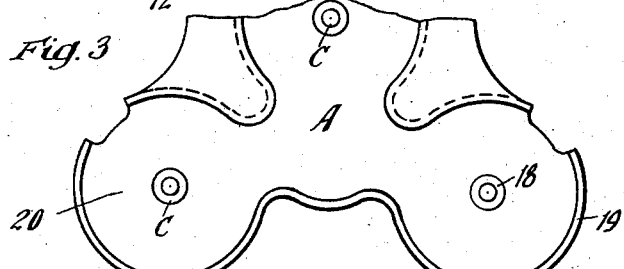
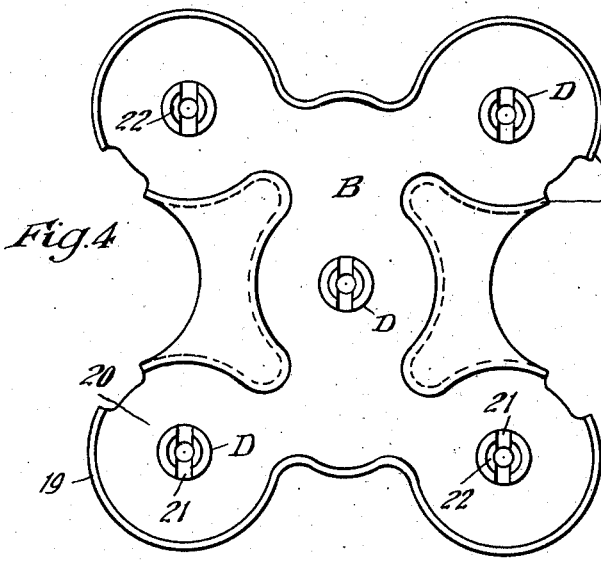
Inventor
Henry A. Miner
By Henry Fuchs
Atty.

Patented Apr. 13, 1948

2,439,484

UNITED STATES PATENT OFFICE 2,439,484

FRICTION SHOCK ABSORBER

Henry A. Miner, Evanston, Ill., assignor to W. H. Miner, Inc., Chicago, Ill., a corporation of Delaware Application January 1, 1944, Serial No. 516,645

7 Claims. (Cl. 267—9)

This invention relates to improvements in friction shock absorbers, especially designed for use in combination with railway car truck springs for snubbing or dampening the action of said springs.

One object of the invention is to provide a friction shock absorber of simple design adapted for use in combination with standard truck springs of a railway car for snubbing the action of the springs without sacrificing the load carrying capacity of said standard springs.

A more specific object of the invention is to provide a friction truck spring snubber comprising cooperating friction members formed integral with the usual truck spring cluster follower plates, wherein the friction members are combined with and are accommodated within the inner coils of the usual spring units, composing the truck spring cluster, thereby retaining the full load carrying capacity of the truck springs.

Other objects of the invention will more clearly appear from the description and claims hereinafter following.

In the drawing forming a part of this specification, Figure 1 is a side elevation of a portion of one of the truck side frames of a railway car, illustrating my improvements in connection therewith, certain of the truck springs and the cooperating follower plates being shown in vertical section. Figure 2 is a central vertical sectional view, on an enlarged scale, of the friction elements, at the left hand side of Figure 1, showing the coils of the corresponding truck spring unit and cooperating truck spring follower plates in vertical section also. Figure 3 is a bottom plan view of the upper spring follower plate and associated friction members shown in Figure 1, said follower plate being partly broken away. Figure 4 is a top plan view of the lower spring follower plate and associated friction members shown in Figure 1.

In said drawing, 10 indicates one of the side frame members of a railway car truck. The side frame 10, as shown, is in the form of a casting and has top and bottom members 11 and 12 connected by spaced vertical sections 13—13 forming guides for the truck bolster. As will be understood by those skilled in this art, the truck includes two side frame members 10—10, a truck bolster 14, a spring plank 15, and the usual truck springs. The opposite ends of the spring plank are supported on the bottom members 12—12 of the truck side frames 10—10, and the opposite ends of the bolster 14 are guided between the sections 13—13 of the truck side frames. As most clearly shown in Figure 1, the sections 13—13 are inwardly offset near the upper ends to provide guides 16—16, which cooperate with guide seats 17—17 at the sides of the bolster 14. The springs at each end of the truck rest on the spring plank 15 and support the corresponding bolster 14, thus yieldingly supporting the latter, which, in turn, supports the car body by means of the usual truck bolster.

My improved friction shock absorber, combined with the usual truck springs, is interposed between the truck bolster and spring plank and forms with said springs a combined spring and friction shock absorber.

My improved combined spring and friction shock absorber comprises broadly a top spring plate A; a bottom spring plate B; a plurality of friction posts C formed integral with the plate A; a plurality of split friction sleeves D formed integral with the plate B; and a plurality of spring units E.

In the present disclosure of my invention, my improvements are illustrated in connection with a truck spring cluster comprising five spring units; however, it is within the scope of the invention to embody my improvements in a truck spring cluster comprising any number of springs, that is, consisting of more or less than five units.

The top spring plate A is preferably in the form of a steel casting and, as shown, has five depending posts C cast integral therewith. Each post C is tapered toward its lower end and presents a longitudinally extending, transversely curved, exterior friction surface 18 which is of conical contour. The spring plate A proper is similar to the usual standard spring plate employed with a truck spring cluster comprising five spring units, being of the same general outline in plan view and having the usual spring centering flanges 19 and spring seats 20.

The bottom spring plate B is also preferably in the form of a casting and, as shown, has five upstanding split tubular sleeves D cast integral therewith. The exterior contour of each sleeve D is preferably cylindrical and the side walls of said sleeve are vertically slotted at diametrically opposite sides, the slots, which are indicated by 21, terminating short of the base of the sleeve. The sleeves D are inwardly tapered, thus being flared toward their upper ends, and present a conical interior friction surface 22. The spring plate B proper is also similar to the usual standard spring plate employed with a cluster of five spring units, being of the same general outline in plan view and having the usual centering flanges and spring seats, which are also indicated by 19 and 20, respectively. The sleeves D project respectively from the centers of the spring seats 20 of the plate B and are in vertical alignment, respectively, with the posts C, which are telescoped within said sleeves.

The sleeves D are tempered to give them spring quality and thus exert a gripping action on the friction surfaces of the posts C as the latter slide inwardly of said sleeves. Each set of friction members C and D thus comprises a tapered friction post and a cooperating split spring sleeve within which the post has sliding engagement to snub the action of the truck springs.

The spring units E are five in number, each unit comprising an inner light coil spring 23 and an outer heavier coil spring 24 surrounding the spring 23. The springs 23 and 24 are preferably identical with the corresponding springs employed in a spring unit of a five unit truck spring cluster.

As shown in the drawing, the springs 23 and 24 of each unit are interposed between the top and bottom spring plates A and B, with the inner coil 23 surrounding the post C and sleeve D and the outer coil 24 surrounding the coil 23.

The operation of my improved combined spring and friction shock absorber is as follows: Upon relative approach of the bolster 14 and spring plank, the spring follower plates A and B are moved toward each other, compressing the springs E therebetween. At the same time, the tapered friction posts C are forced inwardly of the split spring sleeves D. During inward movement of the posts with respect to the sleeves, high frictional resistance is produced between the cooperating friction surfaces thereof, thereby snubbing or dampening the action of the truck springs E. Upon recoil of the springs E, the spring plates A and B are moved apart, thereby pulling the posts outwardly of the sleeves. As will be evident, due to the resiliency of the split spring sleeves, frictional resistance is also had during this action, thereby effectively snubbing the action of the springs E in recoil also.

Although, as illustrated in the drawings, a friction post and cooperating spring sleeve is employed with each spring unit of the spring cluster, a lesser number than all of the spring units of the spring cluster may be provided with such a post and cooperating sleeve, that is, the friction shock absorber comprising the post and split sleeve may be employed in one or more of the spring units, depending upon the amount of snubbing or dampening action found desirable.

I have herein shown and described what I now consider the preferred manner of carrying out my invention, but the same is merely illustrative and I contemplate all changes and modifications that come within the scope of the claims appended hereto.

I claim:

1. In a shock absorber for railway car trucks, the combination with a top spring plate; of a bottom spring plate having a lengthwise split, tubular spring sleeve projecting therefrom, said sleeve being an integral continuation of said plate; a friction post projecting directly from the other plate, said post being slidable within said sleeve in frictional contact with the interior walls thereof, said post being integral with said plate; and spring means interposed between said top and bottom spring plates and bearing directly thereon, said spring means including a coil spring surrounding said post and sleeve.

2. In a shock absorber for railway car trucks, the combination with a top spring plate composed of a single ply of metal; of a bottom spring plate composed of a single ply of metal; a split spring sleeve projecting directly from one of said plates, said sleeve being integral with said plate; a friction post projecting directly from the other plate, said post being slidable within said sleeve in frictional contact with the interior walls thereof, said post being integral with said plate; and a plurality of spring units interposed between said top and bottom spring plates and bearing directly thereon, one of said units including a coil spring surrounding said post and sleeve.

3. In a shock absorber for railway car trucks, the combination with a top spring plate composed of a single ply of metal; of a bottom spring plate composed of a single ply of metal; a plurality of spring units interposed between said top and bottom spring plates and bearing directly on said plates, each unit comprising an inner and an outer coil; a split spring sleeve projecting directly from one of said plates into the inner coil of one of said units, said sleeve being an integral continuation of said plate; and a friction post projecting directly from the other plate, said post being aligned with said sleeve and slidable therein in frictional contact with the interior walls thereof, said post being integral with said last named plate.

4. In a shock absorber for railway car trucks, the combination with a single ply top spring plate; of a single ply bottom spring plate; a plurality of spring units interposed between said top and bottom spring plates and bearing directly thereon, each unit comprising an inner and an outer coil; a plurality of split spring sleeves projecting directly from one of said plates and engaged within the inner coils respectively of a plurality of said units, said sleeves being integral with said plate; and a plurality of friction posts projecting directly from the other plate, said posts corresponding in number to the sleeves and respectively aligned therewith and slidable therein in frictional contact with the interior walls thereof, said posts being integral with said last named plate.

5. In a shock absorber for railway car trucks, the combination with a single ply top spring plate; of a single ply bottom spring plate; a plurality of split spring sleeves projecting directly from one of said plates, said sleeves being integral with said plate; a plurality of friction posts projecting directly from said other plate, said posts corresponding in number with said sleeves and being respectively aligned therewith, said posts being slidable within said sleeves in frictional contact with the interior walls thereof, said posts being integral with said last named plate; and a plurality of spring units interposed between said top and bottom spring plates and bearing directly on said plates, one of said spring units being associated with each cooperating post and sleeve, said spring unit including an inner coil surrounding said post and sleeve, and an outer coil surrounding said inner coil.

6. In a shock absorber for railway car trucks, the combination with a single ply top spring plate; of a single ply bottom spring plate; an interiorly tapered split spring sleeve projecting directly from one of said plates, said sleeve being an integral continuation of said plate; a tapered friction post projecting directly from the other plate, said post being slidable within said sleeve in frictional contact with the interior walls thereof, said post being integral with said plate; and spring means interposed between said top and bottom spring plates and bearing directly on said plates, said spring means including a coil spring surrounding said post and sleeve.

7. In a shock absorber for railway car trucks, the combination with a single ply top spring plate; of a single ply bottom spring plate; an interiorly tapered split spring sleeve projecting directly from one of said plates, said sleeve being integral with said plate; a tapered friction post projecting directly from the other plate, said post being slidable within said sleeve in frictional contact with the interior walls thereof, said post being integral with said plate; and a plurality of spring units interposed between said top and bottom spring plates and bearing directly on said plates, one of said units including a coil spring surrounding said post and sleeve.

HENRY A. MINER.

REFERENCES CITED

The following references are of record in the file of this patent:

UNITED STATES PATENTS

| Number | Name | Date |
|---|---|---|
| 8,496 | Webster | Nov. 4, 1851 |
| 709,999 | McCord | Sept. 30, 1902 |
| 769,841 | Shepard | Sept. 13, 1904 |
| 904,490 | Lukens | Nov. 17, 1908 |
| 1,169,863 | Peycke | Feb. 1, 1916 |
| 1,938,715 | Miner | Dec. 12, 1933 |
| 2,306,396 | Cottrell | Dec. 29, 1942 |